United States Patent [19]

Mimori et al.

[11] Patent Number: 5,198,006
[45] Date of Patent: * Mar. 30, 1993

[54] CERAMIC FILTER FOR A DUST-CONTAINING GAS AND METHOD FOR ITS PRODUCTION

[75] Inventors: Takashi Mimori, Takasago; Hiroshi Maeno, Tokyo; Tasuhiko Endo, Yokohama; Tomohiro Morishita, Kakogawa, all of Japan

[73] Assignee: Asahi Glass Company, Ltd., Tokyo, Japan

[*] Notice: The portion of the term of this patent subsequent to Dec. 17, 2008 has been disclaimed.

[21] Appl. No.: 745,839

[22] Filed: Aug. 16, 1991

Related U.S. Application Data

[63] Continuation of Ser. No. 505,169, Apr. 5, 1990, Pat. No. 5,073,178.

[30] Foreign Application Priority Data

| Apr. 7, 1989 | [JP] | Japan | 1-86907 |
| Apr. 25, 1989 | [JP] | Japan | 1-103537 |
| May 1, 1989 | [JP] | Japan | 1-109189 |

[51] Int. Cl.$^5$ .............................................. B01D 46/24
[52] U.S. Cl. ........................................ 55/523; 55/302; 55/524; 55/DIG. 5; 55/DIG. 9
[58] Field of Search .............. 55/302, 378, 523, 524, 55/527, DIG. 5, DIG. 9

[56] References Cited

U.S. PATENT DOCUMENTS

| 4,356,215 | 10/1982 | Auriol et al. | 55/523 X |
| 4,584,003 | 4/1986 | Oda et al. | 55/269 |
| 4,629,483 | 12/1986 | Stanton | 55/523 X |
| 4,632,683 | 12/1986 | Fukutani et al. | 55/523 |
| 4,746,341 | 5/1988 | Komada | 55/523 X |
| 4,753,457 | 6/1988 | Oda et al. | 285/47 |
| 4,902,319 | 2/1990 | Kato et al. | 55/523 |
| 4,921,616 | 5/1990 | Minjolle | 55/523 X |
| 4,935,042 | 6/1990 | Sudo et al. | 55/523 X |
| 5,073,178 | 12/1991 | Mimori et al. | 55/523 |

FOREIGN PATENT DOCUMENTS

| 2502508 | 10/1982 | France . |
| 2580517 | 10/1986 | France . |
| 57-020269 | 4/1982 | Japan . |
| 58-133810 | 8/1983 | Japan . |
| 60-009843 | 3/1985 | Japan . |
| 60-106514 | 6/1985 | Japan . |
| 61-064815 | 5/1986 | Japan . |
| 63-31517 | 2/1988 | Japan . |
| 63-240912 | 10/1988 | Japan . |
| WO87/01610 | 3/1987 | PCT Int'l Appl. . |

*Primary Examiner*—Robert Spitzer
*Attorney, Agent, or Firm*—Oblon, Spivak, McClelland, Maier & Neustadt

[57] ABSTRACT

A ceramic filter for a dust-containing gas, which comprises a filter base having an average pore size of from 20 to 100 μm, and a filter layer having an average pore size of from 0.2 to 10 μm fixed at least to the filtering side surface of the filter base so that the filter layer fills the pores open on the surface of the filter base.

19 Claims, 1 Drawing Sheet

FIGURE 1

CERAMIC FILTER FOR A DUST-CONTAINING GAS AND METHOD FOR ITS PRODUCTION

This is a continuation of copending application Ser. No. 07/505,169 filed Apr. 5, 1990, now U.S. Pat. No. 5,073,178.

The present invention relates to a ceramic filter useful for removing a dust from a dust-containing gas, particularly from a high temperature dust-containing gas, and a method for its production.

Ceramics are usually excellent in refractoriness and corrosion resistance and suitable as materials for filters for high temperature or corrosive gasses. On the other hand, there is an increasing need for ceramic filters which can be used under severe environmental conditions.

Their applications cover not only pollution control or improvement of the quality of products but also saving of energy or development of an energy such as coal. Therefore, it is desired to develop a high performance ceramic filter for a dust-containing gas, which is a key to accomplish these technical developments.

With respect to filter apparatuses for removing dusts from high temperature dust-containing gases, two typical examples have been published, one is a type employing tube filters as disclosed in U.S. Pat. Nos. 4,584,003 and 4,753,457, and the other a so-called candle type employing tube filters with one end closed, as disclosed in Japanese Examined Patent Publication No. 9843/1985.

In such filter apparatus, if the dust accumulates on the surface of the filters during the use, the pressure loss increases, and the ability for treating the gas decreases. To remove the accumulated dust and regenerate the filters, a compressed gas is blown into the filter apparatus to conduct a reverse cleaning operation by passing the gas through the filters in a reverse direction to the direction during the usual filtration operation, so that the accumulated dust is peeled off from the filter surfaces and transferred to a hopper disposed at a lower portion of the filter apparatus.

It is so designed that the dust collected in the hopper is withdrawn from the filter apparatus, as the case requires, by operating e.g. a valve provided at the lower portion of the apparatus. By the reverse cleaning, the pressure loss of the filters returns to a low level. This reverse cleaning operation is conducted repeatedly at appropriate intervals, whereby the operation of the filter apparatus can be continued while maintaining the pressure loss of the filters always low.

As the filters to be used for a filter apparatus, if the pressure loss is small, it is possible to treat a large amount of a dust-containing gas by a small sized filter apparatus. Therefore, various proposals have been made to reduce the pressure loss of filters.

One of such methods is to use a material having a large porosity and a large average pore diameter as the filters, and introduce a powder called a precoat material, which is collected on these filters and forms a filter layer, during the operation, so that a dust is collected on this precoat material, and the collected dust is removed together with this precoat material.

Japanese Unexamined Patent Publication No. 64315/1986 discloses a method wherein this precoat layer is preliminarily fixed to the filter surface.

Further, Japanese Unexamined Patent Publication No. 31517/1988 discloses a ceramic filter which has a small pressure loss even when it is a thick walled filter and which is substantially free from clogging even when a dust including fine particles is removed from a dust-containing gas without using a precoat material, wherein some modification has been made to the pore size distribution in the filter material.

Further, e.g. Japanese Unexamined Patent Publication No. 133810/1983 discloses a method wherein a thin filter wall of a honeycomb type is employed in an attempt for removing particulates composed essentially of carbon in an exhaust gas from a diesel engine.

In the case where a precoat material is introduced into the filter apparatus, not only the precoat material is wasted, but also the amount of the dust to be disposed increases as the precoat material is included in the collected dust, a part of the dust is likely to pass through the filter, or the dust is trapped in the filter wall, whereby the pressure loss increases, and the pressure loss will not return to a low level even when reverse cleaning is applied. In the case of the honeycomb type filter, the filter wall is so thin that it tends to be broken as it receives a stress repeatedly by the gas pressure during the reverse cleaning. Further, a technology for a large sized filter apparatus has not yet been developed.

In the case of the method wherein the pore size distribution in the filter material is modified, it may be possible to obtain a filter adequately useful for some dust containing gases or for a filter apparatus which is not used for a long period of time, if the filter is prepared in combination with a grog having a suitable particle diameter distribution. It has been found, however, that when it is used for a long period of time as attached to a filter apparatus, there still remains a problem of an increase of the residual pressure loss.

In the case of the method wherein a filter layer is fixed to the filter surface, such problems can be overcome to a large extent, but there still remains a problem that the filter layer is likely to be peeled, or if the filter layer will not be peeled, the residual pressure loss tends to increase discontinuously.

When a filter is to be used at a high temperature, rapid heating or quenching is often unavoidable. Therefore, a material having a small thermal expansion coefficient which is strong against thermal shock, is required.

Among various types of ceramics, a cordierite ceramics has a particularly small thermal expansion coefficient and is a material strong against thermal shock. By utilizing this properties, a cordierite filter for high temperature use has been developed for a certain specific purpose.

For example, Japanese Unexamined Patent Publication No. 133810/1983 discloses a cordierite ceramic filter and a method for its production, wherein a honeycomb type filter is discussed which has a pore size suitable for removing fine particulates in an exhaust gas from a diesel engine, and a method is disclosed for producing a cordierite ceramic filter having a relatively large average pore size. Further, it is disclosed to add an alkaline component such as a lithium oxide component for the purpose of forming relatively large pores.

Further, one of the present inventors has previously proposed a tubular cordierite filter having a pore size distribution hardly susceptible to clogging, for the purpose of removing a dust from a high temperature dust-containing gas. As the filter, the smaller the pressure loss, the better, since it is thereby possible to obtain a large capacity filter apparatus for treating the dust-containing gas. For this purpose, the larger the porosity, the better. However, there is a problem that the strength decreases substantially when the porosity is increased. It is therefore common to find out a compromise point and produce a filter on the basis of such a compromise.

With respect to alumina and silicon carbide which have been practically used as ceramic filters, they have established applications for abrasives or polishing agents. Therefore, by properly selecting a commercial product having a suitable particle size for the grog, it is possible to relatively easily prepare a filter having a small pressure loss and a practical level of strength.

In such a filter, it is common to employ a matrix made of glass or clay. The glass matrix has a problem that the high temperature strength is poor such that the strength at 800° C. is as low as at most ⅓ of the strength at room temperature. Whereas, the clay matrix has a problem that even the strength at room temperature can hardly be increased. On the other hand, commercially available synthetic cordierite grogs have a large porosity in most cases. Accordingly, even if such commercially available grogs are used for the preparation of ceramics filters, the resulting filters will have a large porosity and a large pressure loss, and there has been a problem that if the porosity is increased to reduce the pressure loss, it becomes difficult to maintain the strength at a practical level. When cordierite ceramic filters are to be used in a high temperature and corrosive atmosphere for a long period of time, it is necessary to have ceramic filters which have adequate strength within a wide temperature range of from room temperature to a high temperature to secure the reliability of a filter apparatus, and which are excellent in the thermal spolling resistance and hardly susceptible to clogging, and have a small pressure loss, and which, in the case of removing a dust from a gas including such corrosive gas as $NO_x$ or $SO_x$, are further excellent in the corrosion resistance, particularly in the acid corrosion resistance.

It is an object of the present invention to solve the problems of the cordierite ceramic filters of the conventional techniques and to provide cordierite filters for a dust-containing gas which have a small pressure loss and practical strength and are excellent in the corrosion resistance.

The present invention has been made to solve the above-mentioned problems and provides a ceramic filter for a dust-containing gas, which comprises a filter base having an average pore size of from 10 to 100 μm, with the pore size ratio at positions of 75 vol% and 25 vol% of the accumulated pore size distribution being preferably at least 1.3, and a filter layer having an average pore size of from 0.2 to 10 μm is fixed at least to the filtering side surface of the filter base so that the filter layer fills the pores open on the surface of the filter base. Here, 75 vol% and 25 vol% are numerical values obtained on the basis that the apparent porosity of the filter base is 100 vol%.

Now, the present invention will be described in further detail with reference to the preferred embodiments.

In a preferred embodiment of the ceramic filter of the present invention, the porosity of the filter base is from 35 to 50%.

In another preferred embodiment of the ceramic filter of the present invention, the filter base is made of cordierite or silicon carbide.

In another preferred embodiment of the ceramic filter of the present invention, the filter layer is made of diatomaceous earth or rice hull ash.

In another preferred embodiment of the ceramic filter of the present invention, the filter base has a shape of a tube, and the filter layer is fixed to the inner surface of the tube.

The method for producing the ceramic filter for a dust-containing gas according to the present invention, comprises rubbing a powder at least into the filtering side surface of a powder at least into the filtering side surface of a filter base having an average pore size of from 10 to 100 μm, with the pore size ratio at positions of 75 vol% and 25 vol% of the accumulated pore size distribution being preferably at least 1.3, the powder to form a filter layer having an average particle diameter smaller than the average pore size of the filter base, and fixing the powder with an inorganic binder.

In a preferred embodiment of the method for producing the ceramic filter of the present invention, a first powder is firstly rubbed into the surface of the filter base, and then a second powder finer than the first powder is rubbed into and the both are fixed to the surface.

In another preferred embodiment of the method for producing the ceramic filter of the present invention, the average particle diameter of the first powder is from 20 to 70% of the average pore size of the filter base, and the average particle diameter of the second powder is from 2 to 15% of the average pore size of the filter base.

In another preferred embodiment of the method for producing the ceramic filter of the present invention, the inorganic binder is a solution containing silica as the main component, and this solution is sprayed on the surface into which the powder was rubbed, then heated and dried for fixing. This solution containing silica as the main component, is preferably a 1 to 5 wt% silica sol aqueous solution.

In the ceramic filter of the present invention, the filter base may be of an optional thickness and shape suitable for the particular purpose. However, since a material having a large porosity is employed to minimize the pressure loss, the strength is usually low. To secure the strength required for handling this ceramic filter for a dust-containing gas and to impart adequate strength for the filter base for supporting the filter itself and simultaneously durable against the gas pressure for reverse cleaning, a thickness of at least 5 mm is usually required.

In the ceramic filter of the present invention, the filter base has an average pore size of from 10 to 100 μm. If the average pore size is less than 10 μm, the pressure loss of the filter base tends to be large, and it becomes inadequate for use. On the other hand, if the average pore size exceeds 100 μm, when a filter layer composed of a powder having an average particle diameter of at most 10 μm, is formed on the surface of he filter base, the powder tends to enter deeply into the interior of the filter base, whereby the pressure loss increases, and when a dust leaks to the cleaned gas space side, the dust is likely to enter into the filter base from the rear side of the filter base by reverse cleaning, thus causing an irreversible increase of the pressure loss.

In the present invention, the accumulated pore size distribution of the filter base is measured by means of a mercury porosimeter with respect to cubic shaped samples of 1 cm$^3$ obtained from the filter base.

With the filter base of ceramic filter of the present invention, the ratio of pore sizes at positions of 75 vol% and 25 vol% of the accumulated pore size distribution by the above test samples, is preferably at least 1.3, whereby pores of various sizes are open on the surface of the filter base, and when the filter layer is formed on the filter layer to enter in these pores. This structure is convenient for firmly fixing the filter layer to the filter base, and at the same time the pressure loss is small by the presence of large pores located inside the filter base and communicating to the exterior only through small pores, and even when a dust leaks a little to the cleaned gas space, such leakage will not instantly cause an irreversible increase of the pressure loss, since the filter base can be used by itself as a filter even without the filter layer.

If this pore size ratio is smaller than 1.3, such useful effects will not be obtained.

In order to secure such useful effects, this pore size ratio is preferably at least 1.4.

Taking the easiness of the preparation of the filter base into consideration, this pore size ratio is usually at most 2, more preferably at most 1.8.

The average pore size of the filter layer is within a range of from 0.2 to 10 μm. If the average pore size is less than 0.2 μm, the pressure loss tends to be large, and when used as attached to a filter apparatus, the treating capacity of the filter apparatus will be small, such being undesirable. On the other hand, if the average pore size is larger than 10 μm, for example, a part of the dust in the dust-containing gas tends to pass through the filter layer, thus causing accumulation of the dust in the filter layer or in the filter base, and the pressure loss will increase, such being undesirable.

The apparent porosity of the filter base is preferably at least 35% to assure useful pressure loss level.

However, if the apparent porosity exceeds 50%, the strength of the filter base tends to be low. Therefore, the apparent porosity is preferably at most 50%.

As the ceramics for the filter base, alumina, cordierite, mullite or silicon carbide is preferably employed. From the viewpoint of the thermal spolling resistance and the corrosion resistance, it is preferred to employ cordierite or silicon carbide.

The silicon carbide filter is weak against oxidation by e.g. steam, but its heat resistance is far higher than the cordierite filter.

As a powder material constituting the filter layer, it is possible to employ a powder of e.g. diatomaceous earth, rice hull ash, calcined pearlite, calcium silicate, zeolite, bayer alumina, zircon, cordierite, silicon carbide, siliceous sand or mullite. Among these materials, it is preferred to employ diatomaceous earth or rice hull ash in view of the excellent gas permeability and capability of forming a filter layer having pores with a relatively uniform suitable size for a filter for a dust-containing gas.

The diatomaceous earth and rice hull ash contain silica as the main components and thus advantageous in that they have good corrosion resistance especially against a corrosive gas containing an acid component.

As the shape of the filter base, a tube shape is preferred, since a stress is repeatedly exerted to the filter base by the gas pressure during the reverse cleaning operations, and the pressure loss can be made lower as the gas pressure for the reverse cleaning is higher. With the tube shape, the stress is hardly concentrated, whereby it is possible to avoid concentration of the stress which is likely to cause the breakage of the filter base. It is used so that the gas pressure for the reverse cleaning will be exerted from the outside of the tube. Namely, it is preferred that the filter has a filter layer fixed, to the inner wall of the tube.

With the filter of this type, it is possible to construct a highly reliable filter apparatus, since even when a gas pressure is exerted to the filter base, a tensile stress induced in the filter against which ceramics is usually weak, is small.

With the ceramic filter of the present invention, the thickness of the filter layer is preferably thin so that the pressure loss will be small. For example, the thickness is at a level where a part of the grog at the surface of the filter base is exposed to the filter surface.

In the method for producing the ceramic filter of the present invention, the powder to form a filter layer is rubbed into pores open on the surface of the filter base, by means of e.g. a felt cloth. Accordingly, the average particle diameter of the powder is preferably finer than the average pore size of the filter base.

In order to rub the filter layer-forming powder into the inner wall of a tubular filter base, a rod having a felt cloth wound around one end thereof may be inserted in the tube to rub the powder into the inner wall of the tube.

By such a method for forming a filter layer, it is possible to form a thin filter layer on the surface of the filter base, so that the pressure loss will be relatively small. When a filter layer having a small average pore size is to be formed on the surface of the filter base, it is preferred to rub a relatively coarser first powder into the surface and then rub a second powder having a prescribed particle size into the surface.

In this way, the thickness of the filter layer having a fine particle size can be made thin, whereby the pressure loss, particularly the residual pressure loss when it is used as a filter, can be advantageously be made smaller.

The average particle diameter of the first powder is preferably at most 70% of the average pore size of the filter base, so that the powder will readily be rubbed into the surface of the filter base. In order to obtain a filter having a low pressure loss, the first powder should not be fine and should preferably be at least 20% of the average pore size of the filter base.

The average particle diameter of the second powder is preferably from 2 to 15% of the average pore size of the filter base.

If a powder having an average particle diameter smaller than 2% of the average pore size of the filter base, is employed, the pressure loss will be so large that it is no longer practically useful as a filter for a gas. On the other hand, if the powder is coarser than 15%, there will be no need to divide the rubbing step into two separate operations.

Since the filter is expected to be used also at a high temperature, it is preferred to employ an inorganic binder having refractoriness, more preferably also having corrosion resistance to fix the filter layer. A solution containing silica as the main component is preferred in that it is thereby possible to attain firm fixing as well as refractoriness and corrosion resistance with a small solid content without using so much to clog the pores open to the surface. Thus, a silica sol aqueous solution is an inorganic binder suitable for fixing the filter layer of the ceramic filter of the present invention.

The concentration of the aqueous silica sol solution is at least 1 wt% and at most 5 wt%, because if the concentration is too low, the fixing strength will be small. If the concentration is higher than 5 wt%, the solution tends to be viscous, whereby it becomes difficult to spray the solution in the form of fine droplets and it tends to clog pores open to the surface to impair the gas permeability, such being undesirable.

In the case where a filter layer is formed by means of the first and second powders, an aqueous solution of silica sol may be sprayed after rubbing both powders into the surface. However, the aqueous solution of silica sol may be sprayed twice i.e. once after the rubbing of the first powder and once after the rubbing of the second powder.

Further, it is also possible to employ third and fourth powders. However, no remarkable effects can be expected while the cumbersomeness increases.

When a silica sol is used as an inorganic binder, solidification can be conducted by heating and drying to obtain necessary and adequate fixing strength.

Another ceramic filter of the present invention comprises at least 50 wt% of a cordierite grog having an apparent porosity of at most 10% and a particle diameter of at least 74 $\mu$m, and a matrix, wherein said matrix comprises silica ($SiO_2$) and alumina ($Al_2O_3$) as the main components, and contains lithium oxide ($Li_2O$) in an amount of from 0.05 to 1.0 wt%, based on the weight of the entire filter.

In a preferred embodiment of said another ceramic filter of the present invention, the matrix further contains magnesium oxide (MgO).

In another preferred embodiment of said another ceramic filter of the present invention, the cordierite grog is a cordierite grog crystallized from a glass having approximately a cordierite composition ($2MgO.2Al_2O_3.5SiO_2$).

In another preferred embodiment of said another ceramic filter of the present invention, the cordierite grog is the one obtained by impregnating to a cordierite grog, alumina sol, silica sol, titania sol, zirconia sol or a mixture of at least two types of such sols, which presents an apparent porosity of at most 10% when sintered.

In another preferred embodiment of said another ceramic filter of the present invention, the porosity of the filter material is at least 35%, and the bending strength at 800° C. is at least 75 kg/cm$^2$ In another preferred embodiment of said another ceramic filter of the present invention, the matrix contains from 0.5 to 12 wt%, based on the weight of the entire filter, of $TiO_2$ and/or $ZrO_2$.

In another preferred embodiment of said another ceramic filter of the present invention, the shape of the filter is a straight tube.

Another ceramic filter of the present invention comprises a filter base comprising at least 50 wt% of a cordierite grog having an apparent porosity of at most 10% and a particle diameter of from 74 to 590 $\mu$m, and a matrix, wherein the matrix comprises silica ($SiO_2$) and alumina ($Al_2O_3$) as the main components and contains from 0.2 to 0.6 wt%, based on the weight of the entire filter, of lithium oxide ($Li_2O$), said filter base having an average pore size of from 10 to 100 $\mu$m, with the pore size ratio at positions of 75 vol% and 25 vol% of the accumulated pore size distribution being at least 1.3, and a filter layer having an average pore size of from 0.2 to 10 $\mu$m fixed at least to the filtering side surface of the filter base so that the filter layer fills the pores open on the surface of the filter base.

In a preferred embodiment of such another ceramic filter of the present invention, the cordierite grog is a cordierite grog crystallized from a glass having approximately a cordierite composition ($2MgO.2Al_2O_3.5SiO_2$).

In another preferred embodiment of such another ceramic filter of the present invention, the filter layer is made of diatomaceous earth or rice hull ash.

In another preferred embodiment of such another ceramic filter of the present invention, the shape of the filter base is tube shape, and the filter layer is fixed on the inner wall surface of the tube.

In a method for producing such another ceramic filter of the present invention, a powder material to form a matrix obtained by mixing clay and a powder containing lithium oxide, is mixed to at least 50 wt% of cordierite grog having an apparent porosity of at most 10% and a particle diameter of at least 74 $\mu$m, and an organic binder is added to the mixture, followed by molding and sintering.

In a preferred embodiment of the method for producing such another ceramic filter of the present invention, the cordierite grog having an apparent porosity of at most 10% is the one obtained by mixing materials containing MgO, $Al_2O_3$ and $SiO_2$ to constitute approximately a cordierite composition ($2MgO.2Al_2O_3.5SiO_2$), melting the mixture and cooling it to obtain a glass, which is then crystallized by heat treatment.

In another preferred embodiment of the method for producing such another ceramic filter of the present invention, a $\beta$-spodumene powder is added to the powder material to form the matrix, so that the content of lithium oxide in the filter material will be within a range of from 0.05 to 1.0 wt%.

In another preferred embodiment of the method for producing such another ceramic filter of the present invention, a cordierite powder having a particle diameter of at most 74 $\mu$m, is added to the powder material to form the matrix.

In another preferred embodiment of the method for producing such another ceramic filter of the present invention, a powder of $ZrO_2$ and/or $TiO_2$ is added to the powder material to form the matrix, in an amount of from 0.5 to 12 wt% based on the weight of the filter material.

In another preferred embodiment of the method for producing such another ceramic filter of the present invention, a coke powder is mixed to the starting material, as a pore-forming material which forms pores when burned off.

In another preferred embodiment of the method for producing such another ceramic filter of the present invention, the molding of the filter is conducted by an isostatic press using a metal core mold and an outer cylindrical rubber mold, to form a straight tube.

In another preferred embodiment of the method for producing such another ceramic filter of the present invention, the sintering is conducted within a temperature range of from 1,310° to 1,380° C.

In the method for producing such another ceramic filter of the present invention, the apparent porosity of the cordierite grog is adjusted to be at most 10%. This is effective to minimize the pressure loss of the filter. If the apparent porosity exceeds 10%, the pressure loss tends to be large.

Further, by controlling the apparent porosity of the cordierite grog to a level of at most 10%, the strength of the cordierite grog will be high. Consequently, the strength of the filter itself will be high.

The cordierite grog having a particle diameter of at least 74 μm (the particle diameter not to pass a sieve of 200 mesh) is incorporated in an amount of at most 50 wt%. The grog having a particle size of at least 74 μm is useful for the formation of pores having a size of at least 10 μm suitable for the filter for a gas. A part of the cordierite grog may be as large as 2 mm in diameter. When such a grog is incorporated in an amount of at least 50 wt%, it is possible to impart at least the necessary amount of pores for providing gas permeability useful as a filter.

If the grog having a particle diameter of at least 74 μm is less than 50 wt%, the shrinkage during sintering will be substantial, whereby there will be drawbacks such that the filter undergoes a deformation, and the porosity tends to be small and the pressure loss tends to be large.

It is further preferred to incorporate the cordierite grog in an amount of at least 70 wt%, whereby the sintering shrinkage will be small, and the apparent porosity will be large, and the pressure loss will be small.

Here, the rest is mixed usually in the form of a fine powder, and in the filter after sintering, it constitutes a matrix for the cordierite grog. This matrix preferably has refractoriness slightly lower than the cordierite grog and a thermal expansion coefficient close to the cordierite grog. Accordingly, it preferably has such a composition that during the sintering it partially forms glass. Clay is incorporated in the powder material to form a matrix, because it contains alumina and silica as the main components, and it is effective for the improvement of the moldability and the sinterability.

When the matrix contains lithium oxide in addition to alumina and silica, the matrix will satisfy the above requirements, and in combination with the cordierite grog having a low apparent porosity, a filter having adequate strength not only at room temperature but also at a high temperature of about 800° C., will be obtained.

The content of lithium oxide ($LiO_2$) in the filter material is from 0.05 to 1 wt% (corresponding to the incorporation of from 1 to 20 wt% of β-spodumene). If the content is less than 0.05%, it becomes difficult to obtain a sintered body having sufficient strength. On the other hand, if the content exceeds 1 wt%, the refractoriness of the cordierite ceramic filter will be impaired, such being undesirable. When both the refractoriness and the strength of the resultant filter are taken into consideration, the content of lithium oxide is preferably within a range of from 0.2 to 0.6 wt%.

The reason why a filter maintaining its strength even at a high temperature is obtainable by the matrix containing lithium oxide ($LiO_2$) is not clearly understood, as the phase relation between cordierite and β-spodumene ($LiO_2.Al_2O_3.4SiO_2$) is complex (Yoichi Shiraki, Fine Ceramics p310, 1976, Gihodo). However, it may be explained as follows.

In said another ceramic filter of the present invention, the matrix of the filter containing lithium oxide ($LiO_2$) and comprising alumina ($Al_2O_3$) and silica ($SiO_2$) as the main components, is vitrified in a substantial amount during the sintering to form strong bonding among the grogs.

In this glass, the majority of lithium oxide is contained, and the glass has a low melting point as compared with the grog. By the subsequent cooling, crystallization of the glass will occur.

The formed crystals have a low thermal expansion coefficient, and the matrix as a whole has a thermal expansion coefficient close to the cordierite grog. Thus, there will be presented a cordierite ceramic filter having high room temperature strength and a small residual strain caused by the difference in the thermal expansion from the grog even when cooled to room temperature.

β-Spodumene is added to the powder material to form a matrix, because it is convenient to avoid localization of lithium oxide, and β-spodumene is effective to reduce the thermal expansion coefficient of the entire matrix even when it remains as it is in the filter material. The cordierite powder is incorporated, since it serves to bring the thermal expansion coefficient of the matrix close to the thermal expansion coefficient of the grog.

The cordierite powder having a particle diameter of less than 74 μm serves mainly for the formation of a matrix in said another ceramic filter of the present invention. This is the reason for the limitation of "finer than 74 μm".

Since the resultant matrix contains a relatively large proportion of the crystalline component, the strength is maintained without no substantial softening even at a temperature about 1,000° C.

Natural ores containing lithium oxide such as petalite and eucryptite may also be used as the powder material for forming the matrix.

In the method for producing said another ceramic filter of the present invention, it is preferred to employ a cordierite grog crystallized from the glass, because it is thereby possible to obtain a dense grog, for example, a grog having an apparent porosity of not higher than 4%, although such a grog may need a cumbersome process step for its preparation. Further, as compared with a usual cordierite grog obtained by sintering, the thermal expansion coefficient is smaller by about ½. Accordingly, the filter material will have a small thermal expansion coefficient, and it is thereby possible to obtain a cordierite filter for a gas which is particularly excellent in the thermal spalling resistance. The grog is highly dense, and therefore makes a filter material excellent also in the corrosion resistance. Accordingly, it is possible to produce a cordierite filter for a gas, which is suitable for use particularly under a severe high temperature atmosphere.

As the starting material for the cordierite grog crystallized from the glass, magnesia clinker, bayer alumina and siliceous sand are preferably employed. The production is preferably conducted in such a manner that the melt is once quenched to form a glass, which is then subjected to heat treatment for crystallization, as disclosed, for example, in Japanese Examined Patent Publication No. 20269/1982.

As the synthetic cordierite grog, a sintered product prepared by using talc, clay and aluminum hydroxide as the starting material, may preferably be employed. In order to obtain coarser particles of cordierite having an apparent porosity of at most 10%, it is economical to sufficiently sinter the material at the stage of the preparation of the usual synthetic cordierite, and it is effective to employ a starting material having a zircon powder incorporated to improve the sinterability.

A commercially available synthetic cordierite usually has a porosity higher than 10% and can not be used by itself as the grog for the cordierite filter of the present invention.

Under the circumstances, it may be sintered again for densification. However, as a result of various studies, it has been found that with a grog having a not-so large apparent porosity, the apparent porosity can be changed to a level of at most 10% by impregnating a colloidal solution such as an alumina sol, a silica sol or a titania sol to the cordierite grog. Once the porosity can be brought to a level of at most 10%, it can be used as the grog for the cordierite filter of the present invention without any problem, and the filter thereby produced will have a small pressure loss and high strength.

To sufficiently impregnate the colloidal solution, it is preferred to employ reduced pressure. It is further preferred that the grog is dried, and the impregnation is repeated for further densification.

For the purpose of the present invention, after gelling or drying the grog impregnated with the colloidal solution, it may be used by itself as the grog.

In another ceramic filter of the present invention, the condition that the apparent porosity of the grog is at most 10%, is required to be achieved with the grog after the sintering.

However, in a case where the batch is formed into a tubular filter, and then such a colloidal solution is impregnated, it is likely that pores expected to be used as passages for a gas in the filter, will be clogged and reduced, and the filter will have a large pressure loss, such being undesirable.

The reason why the pressure loss can be reduced by adjusting the apparent porosity of the cordierite grog to a level of at most 10%, is believed to be as follows.

Firstly, on the assumption that the flow of the gas passing through the ceramic filter can be approximated by the equation (Kozeny-Carman equation) representing the flow of a fluid passing through a packed layer of a powder, the pressure loss $\Delta P$ through the filter may be represented by the following equation, provided that the gas passing through the filter is a laminar flow (Fine Particle Measurement, Clyde Orr Jr. et al, Chapter 7, The Macmillan Co., NY, 1959).

$$S_v^2 = (g_c L/2\mu u L_e)(\Delta P/L)[\epsilon^2/(1-\epsilon)^2]$$

Here, $S_v$ is a surface area per unit volume of the solid, $g_c$ is a gravity constant, L is the thickness of the filter, $\mu$ is the viscosity of the gas, u is the apparent velocity of the gas, $L_e$ is the length of a capillarly meandering in the filter, $\epsilon$ is the porosity, and as approximation, there is a relation of $u_c = (u/\epsilon)(L_e/L)$.

Namely, the pressure loss of the gas passing through the filter can be approximated to be proportional to the square of the total surface area of the particles in a unit volume of the filter. Accordingly, to reduce the pressure loss of the filter, the total surface area of the particles in the unit volume of the filter is minimized as far as possible, whereby the pressure loss can be reduced.

Further, in a sintered body, if the apparent porosity is at most 10%, the gas permeability will be so small that it can substantially be neglected (Porous Material, compiled by Ren-ichi Kondo, published by Gihodo, 1973). Therefore, pores in the grog with a porosity of at most 10% will not be concerned with the gas permeability and will not be a cause for the pressure loss.

Namely, the pressure loss is determined primarily by the surface areas of the grog particles and of the structure among the grog particles, whereby a filter having a small pressure loss is believed to be produced.

In order to minimize the pressure loss while improving the gas permeability, it is effective to incorporate to the starting material a pore-forming material capable of forming pores when burned off during the sintering. As such a pore-forming material, a coke powder, particularly a pitch coke powder, is preferably incorporated, since it contains a relatively small amount of impurities such as iron content, whereby coloring can be avoided, and which is readily available and has a proper hardness not to adversely affect the moldability.

An organic binder is incorporated in the starting material primarily for the purpose of imparting strength to the green body to facilitate the molding of the filter and thereby avoiding the breakage of the green body during its handling. However, the incorporation of the organic binder also serves to increase the porosity.

As a method for molding the filter, an isostatic press molding method, a semi-wet rumming or an extrusion molding method may be employed. Among these methods, the isostatic press molding has been most commonly employed as a molding method suitable for the production of a highly dense sintered body. It seems that there has been no instance wherein the isostatic press molding is used as a method for forming porous filters. However, it is a molding method preferred also for the production of such a filter since the drying step can be thereby omitted, a large sized tube filter can be easily formed, and the productivity is good.

Further, a tube shape ceramic filter formed by isostatic press, has a relatively smooth inner surface, since a metal core mold having a smooth surface is used usually for the molding, and when it is used as a filter base, it is convenient to rub a filter layer thinly into the inner surface.

Sintering is conducted in many cases by a tunnel kiln. However, a shuttle kiln or an electric furnace may be employed. The temperature range for sintering is preferably from 1,310° to 1,380° C.

If the sintering temperature is lower than 1,310° C., the sintering will be inadequate, and the strength tends to be low. On the other hand, if the sintering temperature exceeds 1,380° C., there will be drawbacks such that the filter undergoes a deformation during the sintering by the weight of the filter itself, and with the excess sintering, the porosity will be small, such being undesirable.

The apparent porosity is specified to be at least 35%, because such is preferred in order to obtain practically usable gas permeability for a filter. The bending strength at 800° C. of at least 75 kg/cm² is a large value, which has not been attained by conventional cordierite ceramic filters having an apparent porosity of at least 35%.

However, when the cordierite ceramic filter having high strength even at a high temperature thus obtained, was actually used at a high temperature, and then subjected to examination of the bending strength at room temperature, it was found that the strength has decreased.

The reason is not yet clearly understood. However, when the strength decreased, the presence of crystals of β-spodumene was detected in the matrix by the X-ray powder diffraction.

Namely, it is considered that the decrease in the strength is attributable to the change in the structure in the matrix. The addition of the $ZrO_2$ and/or $TiO_2$ component to this matrix is intended to promote the crystallization of glass in the matrix by adding such a component, so that the glass present in the matrix is fully crystallized during the cooling after the sintering to obtain a stabilized state.

By the addition of such a component, after the sintering, the presence of β-spodumene crystals in the matrix of the filter is certainly confirmed by the X-ray powder diffraction. As a result, although the initial strength is sacrificed a little as compared with the case where no such a component has been added, there is no tendency for a decrease of the strength during the use which is observed in the case where no such a component is added. Thus, a cordierite ceramic filter showing stabilized strength, which can be used repeatedly with high reliability, is obtained.

Here, the amount of $ZrO_2$ and/or $TiO_2$ added, is usually from 0.5 to 12 wt%, preferably from 1 to 10 wt%, as the total amount in the filter material. If the total amount is less than 0.5 wt%, no adequate effects for stabilizing the strength will be obtained. On the other hand, if the total amount exceeds 12 wt%, the thermal expansion coefficient of the filter will be large, whereby the thermal spolling resistance tends to be impaired, such being undesirable.

Now, the present invention will be described in further detail with reference to Examples. However, it should be understood that the present invention is by no means restricted by such specific Examples.

EXAMPLE 1

Magnesia, alumina and siliceous sand were mixed to obtain a starting material having a cordierite composition of $2MgO.2Al_2O_3.5SiO_2$. This starting material was electrically melted by employing carbon electrodes, and the melt was poured into water and quenched to obtain a glass having the cordierite composition.

The glass was dried and crushed to obtain glass particles having particle diameters of from 1 to 10 mm, and the particles were put on a cart and heated in a tunnel kiln and maintained at 1,380° C. for 10 hours for crystallization to cordierite.

The product was further crushed and sieved to obtain particles of from 28 to 200 mesh (from 74 to 590 μm), and the particles were used as the grog for the filter base.

When it is desired to adjust the accumulated pore size distribution, the grog is further classified into particles having different particle diameter ranges. The classified particles having different particle diameter ranges will be appropriately mixed to obtain a grog for use.

To 70 wt% of this grog, 6 wt% of a cordierite powder of the same material having a particle size of 200 mesh pass (at most 74 μm), 10 wt% of a cordierite powder of the same material having a particle size of 325 mesh pass (at most 44 μm), 6 wt% of a synthetic β-spodumene powder having a particle size of 325 mesh pass (at most 44 μm) and 6 wt% of a clay powder were mixed. To 100 parts by weight of the mixture, 30 parts by weight of a pitch coke powder having a particle size of from 50 to 100 μm as a pore-forming material and 7 parts by weight of a 40 wt% aqueous solution of a phenol resin as a binder, were mixed.

This mixture was dried at 110° C. and crushed to obtain a granular material having a particle diameter of at most 3 mm.

This granular material was filled in a mold constituted by a steel core mold and an outer cylindrical rubber mold and molded by an isostatic press under a pressure of 1,000 kg/cm² to obtain a tube having an outer diameter of about 170 mm, an inner diameter of about 140 mm and a length of about 850 mm. This tube shaped molded body was sintered in a shuttle furnace at 1,340° C. for 5 hours to obtain a tube-shaped cordierite ceramic filter base. This sintering condition is influential over the pore size distribution, and as the sintering proceeds, the average pore size increases, and the apparent porosity will decrease. As a filter base, it is usual that both ends are cut off to obtain a tube shaped base having a length of 800 mm for use.

This filter base had an apparent porosity of 42%. With respect to cube shaped samples cut out from the filter base, the accumulated pore size distribution was measured by a mercury porosimeter, whereby the results as shown by a in FIG. 1 were obtained.

Figure 1:
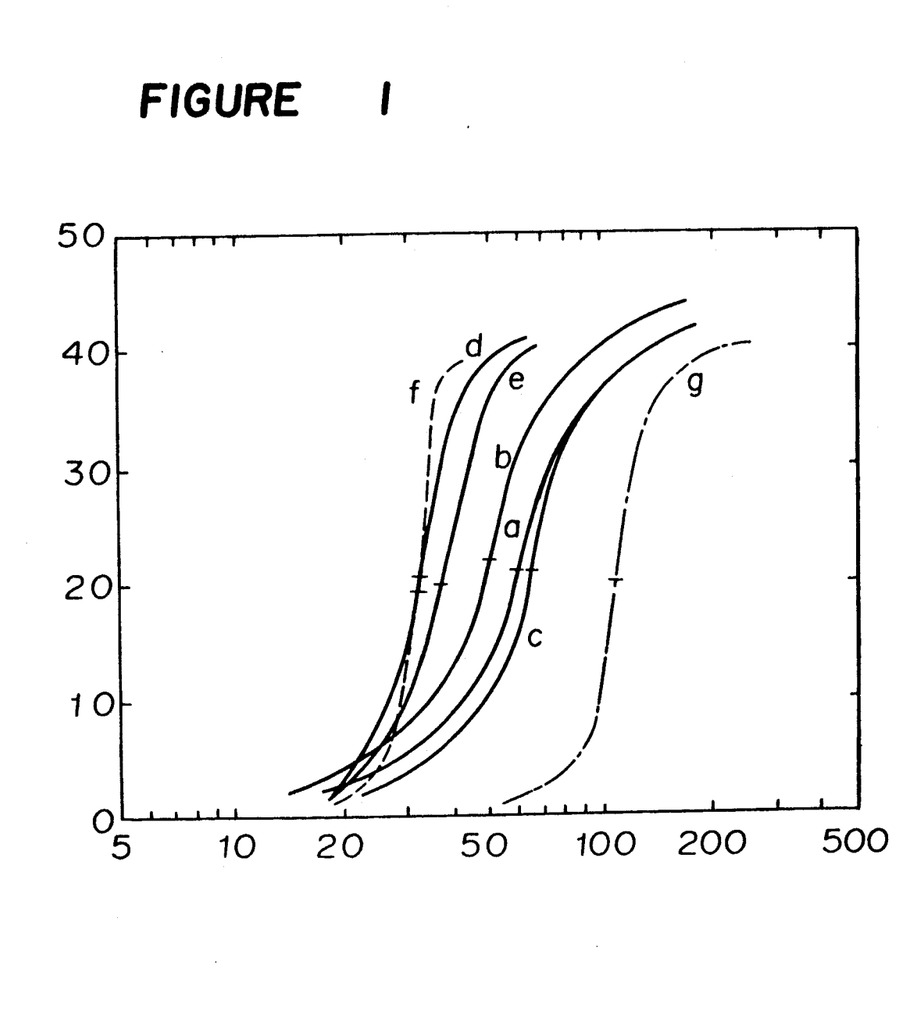
FIG. 1 is a graph showing the accumulated pore size distribution of a ceramic filter base, which shows the results of the measurements by a mercury porosimeter with respect to cube shaped test samples cut out from the ceramics filter base of about 1 cm³. In this Figure, the ordinate represents the accumulated pore volume in the test samples, and the abscissa represents the pore size. In the Figure, curves a, b, c and d represent the pore size distributions of the samples taken from the filter bases of Examples 1, 2, 3 and 4, respectively. Curves e, f and g represent the pore size distributions of the test samples obtained from the filter bases of Comparative Examples 1, 2 and 3, respectively.

Namely, the average pore size of this filter base (at the position of 50 vol%) was 60 μm, the pore size $D_{75}$ at the position of 75 vol% was 76 μm, and the pore size $D_{25}$ at the position of 25 vol% was 43 μm.

Accordingly, in this filter base, the $D_{75}/D_{25}$ ratio R was 1.77.

Diatomaceous earth powder having an average particle size of 3.6 μm was sprinkled on the inner surface of this tube filter base cut to have a length of 400 mm, and the diatomaceous earth powder was rubbed into the inner surface by using a felt cloth.

A silica sol aqueous solution having a $SiO_2$ concentration of 2.3 wt% was uniformly sprayed on the surface having the diatomaceous earth powder rubbed thereinto and dried at 150° C. in a dryer for solidification.

With respect to this tube filter, the pressure loss was measured at an air flow velocity of 5 cm/sec and found to be 320 mmWG.

This filter was mounted to a filtration test apparatus, and an air containing 7.3 g/m³ of a blast furnace ash having an average particle diameter of 10 μm as a dust and having a temperature of 150° C., was supplied to the inner side of the tube filter to conduct a filtration test. Except for the term of reverse cleaning, the filtration velocity of the gas (the gas in this case was air) in the test was set at a level of about 7.6 cm/sec. During filtration period, the dust in the gas was collected and accumulated on the inner wall of the tube filter, whereby the pressure loss gradually increased.

Therefore, at an interval of once every 7.5 minutes, a compressed air of about 6 kg/cm² was blown from a nozzle into the filtration test apparatus for 0.4 second to conduct the reverse cleaning of the filter.

The pressure loss of the filter after the reverse cleaning gradually increased at the initial stage of the operation, and about 150 hours later, the pressure loss before and after the reverse cleaning became a constant level, and the residual pressure loss was 1,600 mmWG immediately before the reverse cleaning, and 1,300 mmWG immediately after the reverse cleaning.

Thereafter, the test was continued. The test was conducted for a total of about 300 hours, but no increase in the residual pressure loss was observed.

In Table 1, the conditions for the production of the filter, the filter properties, the conditions for testing the filter and the results of the test of the filter are shown with respect to Examples 1 to 4.

EXAMPLE 2

Under the same conditions as in Example 1, a tube filter base was prepared. The accumulated pore size distribution of this filter is shown by b in FIG. 1. This filter base had $D_{75}$ of 65 μm, $D_{25}$ of 36 μm and R of 1.80.

Diatomaceous earth powder having an average particle diameter of 20 μm was sprinkled on the inner surface of this tube filter base cut to have a length of 400 mm and rubbed into the surface by means of a felt cloth.

In this state, the pressure loss was measured by passing an air at a flow velocity of 5 cm/sec and found to be 125 mmWG.

Further, diatomaceous earth powder having an average particle diameter of 3.6 μm was rubbed thereon in the same manner. In this state, the pressure loss was measured by passing an air at a flow velocity of 5 cm/sec and found to be 250 mmWG.

An aqueous silica sol solution was sprayed to this surface having diatomaceous earth powder rubbed thereinto, in the same manner as in Example 1, and heated and dried.

In this state, the pressure loss was measured by passing an air at a flow velocity of 5 cm/sec and found to be 300 mmWG. This ceramic filter was mounted on the same filtration test apparatus as used in Example 1, and the filtration test was conducted under the same conditions, whereby about 55 hours later, the residual pressure loss before and after the reverse cleaning became a constant level, i.e. it was 1,100 mmWG immediately before the reverse cleaning and 950 mmWG immediately after the reverse cleaning.

Thereafter, the test was continued. The test was conducted for a total of about 500 hours, whereupon no increase of the residual pressure loss was observed.

EXAMPLE 3

Under the same conditions as in Example 1, a tube filter base was prepared. The accumulated pore distribution of this filter base is shown by c in FIG. 1, and it had $D_{75}$ of 80 μm, $D_{25}$ of 48 μm, and a $D_{75}/D_{25}$ ratio R of 1.67.

An alumina powder having an average particle diameter of 6 μm was sprinkled on the inner surface of this tube filter base cut to have a length of 400 mm and rubbed into the surface by means of a felt cloth. An aqueous silica sol solution was sprayed thereon in the same manner as in Example 1 and heated and dried for fixing. In this state, the pressure loss was measured by passing an air at a flow velocity of 5 cm/sec and found to be 350 mmWG.

This ceramic filter was mounted on the same filtration test apparatus as used in Example 1, and the filtration test was conducted under the same conditions.

As a result, the pressure loss was stabilized upon expiration of about 170 hours. Thereafter, the test was continued for about 130 hours, whereby no change in the residual pressure loss was observed.

The residual pressure loss after the stabilization of this filter was 2,200 mmWG immediately before the reverse cleaning and 1,800 mmWG immediately after the reverse cleaning.

EXAMPLE 4

A filter base was prepared in the same manner as in Example 1 except that the batch composition of the grog, the matrix and the pore-forming material was changed as shown in Table 1.

The accumulated pore size distribution of this filter base is shown by d in FIG. 1. It had an apparent porosity of 41%, an average pore size of 38 μm, $D_{75}$ of 38 μm, $D_{25}$ of 27 μm, and a $D_{75}/D_{25}$ ratio R of 1.41.

A filter layer of diatomaceous earth powder having an average particle diameter of 3.6 μm was fixed to the tube filter base cut to have a length of 400 mm, in the same manner as in Example 1, and the pressure loss was examined by passing an air at a flow velocity of 5 cm/sec and found to be 290 mmWG.

This filter was mounted on the same filtration test apparatus, and the test was conducted in the same manner. As a result, the pressure loss was stabilized upon expiration of about 100 hours, and the residual pressure loss after the stabilization was 1,500 mmWG immediately before the reverse cleaning and 1,250 mmWG immediately after the reverse cleaning.

Thereafter, the test was continued for about 200 hours, whereby no change in the residual pressure loss was observed.

COMPARATIVE EXAMPLE 1

A filter base was prepared under the conditions as identified by Comparative Example 1 in Table 2. The other conditions are the same with Example 1. The accumulated pore size distribution of this filter base is shown by e in FIG. 1. It had an apparent porosity of 40%, an average pore size of 37 μm, $D_{75}$ of 45 μm, $D_{25}$ of 30 μm, a $D_{75}/D_{25}$ ratio R of 1.5, and a pressure loss of 96 mmWG when an air was passed at a flow velocity of 5 cm/sec.

This filter base cut to have a length of 400 μm was mounted on the above-mentioned filtration test apparatus as it was i.e. without providing a filter layer, and the filtration test was conducted in the same manner.

As a result, the residual pressure loss was substantially stabilized upon expiration of about 100 hours, and it was 1,600 mmWG immediately before the reverse cleaning and 1,400 mmWG immediately after the reverse cleaning.

However, the residual pressure loss showed a slight increase thereafter. The test was continued further for about 200 hours, whereupon an increase of about 90 mmWG was observed.

In Table 2, with respect to Comparative Examples 1, 2 and 3, the conditions for the production of the filter, the filter properties, the conditions for testing the filter and the test results of the filter are shown.

EXAMPLE 12

A filter base was prepared under the conditions as identified by Example 12 in Table 2.

The accumulated pore size distribution of this filter base is shown by f in FIG. 1. It had an apparent porosity of 40%, an average pore size of 32 μm, $D_{75}$ of 35 μm, $D_{25}$ of 29 μm and a $D_{75}/D_{25}$ ratio R of 1.21.

To the tube filter base cut to have a length of 400 mm, a filter layer was fixed in the same manner as-in Example 1, and the pressure loss was examined by passing an air at a flow velocity of 5 cm/sec and found to be 290 mmWG.

This filter was mounted on the above-mentioned filtration test apparatus, and the filtration test was conducted in the same manner.

About 100 hours later, the pressure loss was stabilized, and the residual pressure loss was 1,700 mmWG immediately before the reverse cleaning and 1,400 mmWG immediately after the reverse cleaning.

However, the residual pressure loss showed a slight increase. Upon expiration of about 200 hours, an increase of the residual pressure loss of 80 MMWG was observed.

COMPARATIVE EXAMPLE 3

A filtration test was conducted with respect to a silicon carbide filter available as a commercial product.

This filter uses a grog of silicon carbide having a particle size within a range of from about 300 to 850 μm, and the matrix is considered to be composed essentially of clay judging from the composition.

The size was about 60 $\phi$/30$\phi$×1,000 mm, and the filter was of a tube shape with one end closed. It had an apparent porosity of 40%, and the bending strength was slightly small at a level of about 120 kg/cm$^2$.

The pore size distribution of the filter base examined in the same manner as above is shown by g in FIG. 1.

As a result, it had an average pore size of 110 μm, $D_{75}$ of 124 μm, $D_{25}$ of 98 μm and a $D_{75}/D_{25}$ ratio R of 1.26.

Over the outer side surface of this tube filter, a filter layer containing an alumina silica-type fiber, is fixed. The pressure loss was examined by passing an air at a flow velocity of 5 cm/sec to this filter and found to be 300 mmWG.

This filter was cut into a tube having a length of 400 mm and mounted on the above-mentioned filtration test apparatus. The filtration test was conducted in the same manner as above except that the filter apparatus was modified so that the dust-containing gas was supplied to the exterior side of the tube as contrasted to the above-mentioned test.

As a result, about 200 hours later, the pressure loss appeared to be constant. The residual pressure loss at that time was 700 mmWG immediately before the reverse cleaning and 600 mmWG immediately after the reverse cleaning.

However, a gradual increase was observed thereafter. Upon further expiration of about 100 hours and about 250 hours thereafter, increases of the residual pressure loss of 150 mmWG and 350 mmWG were observed discontinuously.

The cause for this discontinuous increase of the residual pressure loss is not clearly ascertained. However, such a phenomenon is likely to take place when the filter layer is peeled off.

Now, Examples for another ceramic filter of the present invention will be described.

As the cordierite grog, seven types of materials i.e. a, b, c, d, e, f and g, were prepared.

a. Magnesia, alumina and siliceous sand were mixed to constitute a cordierite composition of 2MgO.2Al$_2$O$_3$.5SiO$_2$. The mixture was electrically melted by employing carbon electrodes, and the melt was poured into water and quenched to obtain a glass having the cordierite composition. The glass was taken out and crushed to obtain glass particles having a particle diameter of from 1 to 10 mm.

The particles were introduced to a tunnel kiln and heat-treated at about 1,380° C. for 10 hours for crystallization.

The product was crushed and classified by sieving to obtain particles having a size of from 74 to 590 μm.

The average particle diameter of this grog was 270 μm, and the apparent porosity was 3%.

b. Fine powders of talc, clay, aluminum hydrooxide and zircon were mixed to constitute a cordierite composition comprising a chemical component of MgO.2Al$_2$O$_3$5SiO$_2$ as the main component and containing 3 wt% of ZrO$_2$. To 100 parts by weight of the mixed raw material, 2 parts by weight of methylcellulose and a suitable amount of water were added, and the mixture was kneaded and extruded into a rod having an outer diameter of about 30 mm.

The rod was dried and then put on a cart and introduced into a tunnel kiln, and held at a maximum temperature of 1,360° C. for 10 hours to obtain a synthetic cordierite.

This product was crushed and classified by sieving to obtain particles having a particle size within a range of from 74 to 590 μm.

The average particle diameter of this grog was 265 μm, and the apparent porosity was 7%.

c. Fine powders of talc, clay and aluminum hydroxide were mixed to constitute a cordierite composition of 2MgO.2Al$_2$O$_3$.5SiO$_2$. To 100 parts by weight of the mixed raw material, 2 parts by weight of methylcellulose and a suitable amount of water were added, and the mixture was kneaded and extrusion-molded into a rod having an outer diameter of about 30 mm.

The rod was dried and then put on a cart and introduced into a tunnel kiln, and maintained at the maximum temperature of 1,360° C. for 10 hours to obtain a synthetic cordierite.

The product was crushed and classified by sieving to obtain grog having a particle size of from 74 to 590 μm.

This grog had an average particle diameter of 250 μm and an apparent porosity of 12%.

A commercial product synthetic cordierite grog was crushed and classified by sieving to obtain grog having a particle size of from 74 to 590 μm.

The grog had an average particle diameter of 230 μm and an apparent porosity of 30%.

e. An alumina sol was impregnated to the cordierite grog obtained in c, and dried under reduced pressure. The same operation was repeated once again.

After heating this grog at 1,000° C., the apparent porosity was 8%.

f and g. A silica sol and a titania sol were repeatedly impregnated, respectively, to the cordierite grog obtained in c, followed by drying.

After heating these grogs at 1,000° C., the apparent porosities were 7% and 8%, respectively.

A powder of β-spodumene was prepared in the following manner. Powders of pyrophyllite and lithium carbonate were mixed in the proportions of 85 wt% and 15 wt%, respectively, and the mixture was further mixed and milled in a wet system. The filter press cake thus obtained was dried and then sintered at a temperature of 1,150° C. in an electric furnace to obtain β-spodumene. This was finely pulverized and sieved with a sieve of 325 mesh. Using seven types of cordierite grogs a to g, tube-shaped cordierite filters for a gas were prepared under the conditions as identified in Tables 3 and 4.

The Examples and Comparative Examples in Table 3 are directed to the examination of the effects of the porosity of the grog and the blend ratio of the grog mainly over the filter properties.

In these Examples, a mixture comprising 10 wt% of clay, from 10 to 25 wt% of a fine powder of cordierite of the same material with the grog and 5 wt% of a fine $\beta$-spodumene powder, was used for the matrix. To 100 parts by weight of this mixture, 25 parts by weight of a coke powder having a particle diameter of from 20 to 100 $\mu$m was added as a pore-forming material, and 7 parts by weight of a 40 wt% aqueous solution of a phenol resin was added as an organic binder. The mixture was mixed, dried at 110° C. and then crushed to obtain a granular material having a particle diameter of at most 3 mm.

This material was filled in a mold constituted by a steel columnar core mold and an outer cylindrical rubber mold and molded by an isostatic press under a pressure of 1,000 kg/Cm$^2$ to obtain a tube having an outer diameter of about 170 mm, an inner diameter of about 140 mm and a length of about 850 mm.

This tube-shaped molded body was sintered in an electric furnace at the maximum temperature of 1,320° C. for 5 hours to obtain a tube-shaped ceramic filter.

When the sintering was conducted in a tunnel kiln, a filter having substantially the same sintered state was obtained as in the case where sintering was conducted at a temperature of about 1,350° C.

The properties examined with respect to the respective tube filters are shown in Table 3.

In other Examples and Comparative Examples, tube filters were prepared under the same conditions as above except that the conditions as identified in Table 3, and their properties are also shown in Table 3.

Here, the apparent porosity is the value measured by a water immersion method, and the average pore size is the value measured by a mercury porosimeter with respect to cube shaped test samples of 1 cm$^3$.

Further, the bending strength was measured by a three point bending test with a span of 70 mm with respect to a test piece of 14×20×100 mm.

The acid corrosion resistance was examined in such a manner that the test piece was immersed in a 1N H$_2$SO$_4$ aqueous solution for 72 hours at room temperature, whereupon the change in the bending strength was examined.

Further, the filtering property was determined in such a manner that a tube filter cut to have a length of 400 mm was mounted on the filtration test apparatus equipped with a reverse cleaning system, a dust of a ferric oxide powder having an average particle diameter of about 50 $\mu$m was dispersed in air at a concentration of g/Nm$^3$ to form a dust-containing gas at a temperature of 300° C., and the filtration test was conducted for 100 hours each at a filtration velocity of the gas of 5 cm/sec.

The reason for using the ferric oxide powder is that this powder has a color and can easily be observed when it is penetrated into the ceramic filter.

The particle size distribution of the ferric oxide powder was such that less than 1 $\mu$m was 1 wt%, from 1 to 10 $\mu$m was 7 wt%, from 10 to 40 $\mu$m was 35 wt%, from 40 to 100 $\mu$m was 46 wt%, and from 100 to 800 $\mu$m was 11 wt%.

Table 4 shows the results of the examination of the effects of the change of the composition of the matrix over the properties of the filter material and over the filtration properties. Among the conditions for the production of the filter, those not shown in the Table were the same as mentioned above.

Bentonite contains an alkali component and when sintered, it readily vitrifies to form a glass matrix, whereby a filter having high strength at room temperature is obtained.

In Table 4, the amount of ZrO$_2$ and/or TiO$_2$ is represented by parts by weight as the ratio relative to 100 parts by weight of the total weight of the grog and matrix component.

As a method for examining the presence or absence of a decrease of the strength during use, a test piece for bending strength cut out from the ceramic filter is maintained in an electric furnace at 900° C. for 24 hours, and then the bending strength at room temperature was measured.

As a result, it has been found that ceramics filters having zirconia and/or titania added to the matrix, show a little decrease in the initial strength, but no decrease in the strength after the heat treatment was observed.

Examples of the filtration test results of another ceramic filter of the present invention are also shown by Comparative Example 1 in Table 2.

The dust used in this test was not a ferric oxide powder. In this test using a blast furnace ash as the dust, a slight increase of the residual pressure loss was observed when the filter was used for a long period of time. The increase of this level is not a fatal problem in a usual practice.

The ceramic filter for a gas of the present invention is the one wherein a filter layer is fixed on the surface of a filter base having a specific pore size distribution so that the filter layer is scarcely peeled. It can be produced by a relatively simple method. When it is used as a filter for a gas, it is effective in that the filter layer will not be peeled, and when it is repeatedly regenerated by reverse cleaning and used, no increase in the residual pressure loss after stabilization is observed.

Further, when the ceramic filter of the present invention is constructed properly with a combination of proper grog material, matrix material, filter layer material and inorganic binder, it is possible to obtain a filter which can be used for the filtration of a dust-containing gas having a corrosive nature and a high temperature stably for a long period of time.

By another ceramic filter of the present invention and the method for its production, a ceramic filter suitable particularly for the filtration of a high temperature gas, which is excellent in the thermal spolling resistance and corrosion resistance and has a small pressure loss and high strength even at a high temperature at a level of 800° C., and a method for its production, have been shown.

In said another ceramic filter of the present invention, a grog having a low apparent porosity of at most 10%, particularly a cordierite grog having a very low apparent porosity crystallized from a glass, is used and combined with a matrix containing lithium oxide, whereby a filter for a gas having a small pressure loss, high strength even with a large porosity and being capable of maintaining this strength even at a high temperature and at the same time having excellent corrosion resistance, particularly excellent acid corrosion resistance, is obtainable. Since the pressure loss of the filter is small, the treating capacity of the dust-containing gas can be increased even when the same filtration apparatus is employed. Since the filter strength is adequate, breakage of the filter during the installment and the maintenance of the filtration apparatus, is substantially reduced, and the reliability of the apparatus is remarkably improved.

Further, a silicon carbide filter which is considered to be prospective presently, has been found to have a problem that it is susceptible to oxidation by steam contained in a combustion gas, whereby pores are likely to be clogged, or the pressure loss tends to be large. Whereas, another ceramic filter according to the present invention has excellent durability in an acidic corrosive gas atmosphere containing steam, $NO_x$ and $SO_x$, such as a combustion gas of coal, and thus is useful for the filtration of a combustion gas from a fluidized bed combustion boiler or a pressurized fluidized bed combustion boiler in which coal is burned for power generation, or for the filtration of a synthetic gas produced by a coal gasification furnace.

With another ceramic filter of the present invention, there has been a tendency that the strength decreases when used at a high temperature. However, by adding $TiO_2$ and $ZrO_2$ to the matrix so that an instable glass phase in the matrix is converted to crystals by sintering, it has been improved to a reliable filter having no tendency for a decrease of the strength.

Said another ceramic filter of the present invention is widely useful for the removal of a dust from various high temperature dust-containing gases discharged from industry employing high temperatures, and makes it possible to recover and effectively use a heat energy which used to be difficult to recover and wasted since it contains a dust. Further, with the filtrated high temperature gases, removal of $NO_x$ or $SO_x$ is facilitated, and the dust is recovered in a dried state, which facilitates effective utilization of the dust.

By mounting the ceramic filter for a gas of the present invention on a filtration apparatus, it is possible to obtain a filtration apparatus which is relatively small in size and yet has a large capacity, and which has a wide range of applications. For example, the application field of the filtration apparatus expands to cover the filtration of a gas from a coal gasification process and the filtration of a combustion gas under pressure from a pressurized fluidized bed combustion boiler for power generation in which coal is burned. Thus, the present invention opens a way for efficient utilization of a coal energy without pollution and thus its value for industrial application is significant.

TABLE 1

|  | Example 1 | Example 2 |
|---|---|---|
| Conditions for the production of the filter base |  |  |
| Grog: |  |  |
| Material | Cordierite | Cordierite |
| Particle diameter μm | 74 to 590 | 74 to 590 |
| Amount wt % | 70 | 70 |
| Matrix wt % | Cordierite: at most 74 μm 6, at most 44 μm 10 β-spodumene: at most 44 μm 6, Clay 10 | Cordierite: at most 74 μm 6, at most 44 μm 10 β-spodumene: at most 44 μm 6, Clay 10 |
| Pore-forming material, wt parts | Coke powder 30 | Coke powder 30 |
| Molding | I. press 1,000 kg/cm² | I. press 1,000 kg/cm² |
| Sintering | 1,340° C. × 5 hr, Shuttle furnace | 1,340° C. × 5 hr, Shuttle furnace |
| Dimension of the filter mm | 170 φ/140 φ × 800 | 170 φ/140 φ × 800 |
| Properties of the filter base |  |  |
| Porosity % | 42 | 44 |
| Average pore size μm | 60 | 50 |
| $D_{75}/D_{25} = R$ | 76/43 = 1.77 | 65/36.5 = 1.78 |
| Filter layer |  |  |
| Material | Diatomaceous earth 3.6 μm | Diatomaceous earth 20 μm, 3.6 μm |
| Binder | Silica sol 2.3 wt % | Silica sol 2.3 wt % |
| Properties of the filter Pressure loss mmWG (air 5 cm/sec) | 320 | 300 |
| Conditions for testing the filter |  |  |
| Dust-containing gas | 150° C. air + Blast furnace ash | 150° C. air + Blast furnace ash |
| Dust concentration g/m³ | 7.3 | 7.3 |
| Gas filtration veloctiy | 7.6 | 7.6 |
| Reverse cleaning gas | Compressed air about 6 kg/cm² | Compressed air about 6 kg/cm² |
| Reverse cleaning time sec | 0.4 | 0.4 |
| Reverse cleaning interval min | 7.5 | 7.5 |
| Filter test results Change of the residual pressure loss | Stabilized after about 150 hrs, and no change observed thereafter | Stabilized after about 55 hrs, and no change observed thereafter |
| Pressure loss after stabilization |  |  |
| Immediately before reverse cleaning | 1600 | 1100 |
| Immediately after reverse cleaning | 1300 | 950 |
|  | Example 3 | Example 4 |
| Conditions for the production |  |  |

TABLE 1-continued

| of the filter base | | |
|---|---|---|
| Grog: | | |
| Material | Cordierite | Cordierite |
| Particle diameter μm | 74 to 590 | 74 to 590 |
| Amount wt % | 70 | 75 |
| Matrix wt % | Cordierite: at most 74 μm 6, at most 44 μm 10 β-spodumene: at most 44 μm 6, Clay 10 | Cordierite: at most 74 μm 10, β-spodumene: at most 44 μm 5, Clay 10 |
| Pore-forming material, wt parts | Coke powder 30 | Coke powder 25 |
| Molding | I. press 1,000 kg/cm$^2$ | I. press 1,000 kg/cm$^2$ |
| Sintering | 1,340° C. × 5 hr, Shuttle furnace | 1,320° C. × 5 hr, Electric furnace |
| Dimension of the filter mm | 170 φ/140 φ × 800 | 170 φ/140 φ × 800 |
| Properties of the filter base | | |
| Porosity % | 42 | 41 |
| Average pore size μm | 65 | 32 |
| $D_{75}/D_{25} = R$ | 80/48 = 1.67 | 38/27 = 1.41 |
| Filter layer | | |
| Material | Alumina 6 μm | Diatomaceous earth 3.6 μm |
| Binder | Silica sol 2.3 wt % | Silica sol 2.3 wt % |
| Properties of the filter | | |
| Pressure loss mmWG (air 5 cm/sec) | 350 | 290 |
| Conditions for testing the filter | | |
| Dust-containing gas | 150° C. air + Blast furnace ash | 150° C. air + Blast furnace ash |
| Dust concentration g/m$^3$ | 7.3 | 7.3 |
| Gas filtration veloctiy | 7.6 | 7.6 |
| Reverse cleaning gas | Compressed air about 6 kg/cm$^2$ | Compressed air about 6 kg/cm$^2$ |
| Reverse cleaning time sec | 0.4 | 0.4 |
| Reverse cleaning interval min | 7.5 | 7.5 |
| Filter test results Change of the residual pressure loss | Stabilized after about 70 hrs, and no change observed thereafter | Stabilized after about 100 hrs, and no change observed thereafter |
| Pressure loss after stabilization | | |
| Immediately before reverse cleaning | 2200 | 1500 |
| Immediately after reverse cleaning | 1800 | 1250 |

TABLE 2

| | Comparative Example 1 | Example 12 | Comparative Example 3*[1] |
|---|---|---|---|
| Conditions for the production of the filter base | | | |
| Grog: | | | |
| Material | Cordierite | Cordierite | Silicon carbide |
| Particle diameter μm | 74 to 590 | 250 to 590 | About 300 to 850 μm |
| Amount wt % | 60 | 75 | |
| Matrix wt % | Cordierite: at most 74 μm 25, β-spodumene: at most 44 μm 5, Clay 10 | Cordierite: at most 74 μm 10, β-spodumene: at most 44 μm 5, Clay 10 | Clay-like |
| Pore-forming material, wt parts | Coke powder 25 | Coke powder 25 | |
| Molding | I. press 1,000 kg/cm$^2$ | I. press 1,000 kg/cm$^2$ | |
| Sintering | 1,320° C. × 5 hr, Electric furnace | 1,320° C. × 5 hr, Electric furnace | |
| Dimension of the filter mm | 170 φ/140 φ × 800 | 170 φ/140 φ × 800 | 60 φ/30 φ × 1,000 |
| Properties of the filter base | | | |
| porosity % | 40 | 39 | 40 |
| Average pore size μm | 37 | 32 | 110 |
| $D_{75}/D_{25} = R$ | 45/30 = 1.5 | 35/29 = 1.21 | 124/98 = 1.26 |
| Filter layer | | | |
| Material | Nil | Diatomaceous earth 3.6 μm | Containing alumina-silica fiber |
| Binder | | Silica sol 2.3 wt % | |
| Properties of the filter | | | |
| Pressure loss mmWG (air 5 cm/sec) | 96 | 290 | 300 |
| Conditions for testing the filter | | | |
| Dust-containing gas | 150° C. air + Blast furnace ash | 150° C. air + Blast furnace ash | 150° C. air + Blast furnace ash |
| Dust concentration g/m$^3$ | 7.3 | 7.3 | 7.3 |
| Gas filtration veloctiy | 7.6 | 7.6 | 7.6 |

TABLE 2-continued

|  | Comparative Example 1 | Example 12 | Comparative Example 3*1 |
|---|---|---|---|
| Reverse cleaning gas | Compressed air about 6 kg/cm² | Compressed air about 6 kg/cm² | Compressed air about 6 kg/cm² |
| Reverse cleaning time sec | 0.4 | 0.4 | 0.4 |
| Reverse cleaning interval min | 7.5 | 7.5 | 7.5 |
| Filtration test results Change of the residual pressure loss | The residual pressure loss became substantially constant after about 100 hrs. However, an increase of 90 mmWG was observed after the subsequenet test for 200 hrs. | The residual pressure loss became substantially constant after about 100 hrs. However, an increase of 80 mmWG was observed after the subsequenet test for 200 hrs. | The residual pressure loss became substantially constant after about 200 hrs. However, a gradual increase and occasionally a stepwise increase were observed thereafter. Not stabilized. |

*1 Commercially available product

TABLE 3

|  | Apparent porosity of grog (%) | Examples | | | | | | | | Comparative Examples | | |
|---|---|---|---|---|---|---|---|---|---|---|---|---|
|  |  | 1 | 2 | 3 | 4 | 5 | 6 | 7 | 12 | 1 | 3 | 4 |
| Cordierite grog (wt %) | | | | | | | | | | | | |
| a. Crystallized cordierite*1 | 3 | 60 | | | | | 75 | | | | 40 | |
| b. Synthetic cordierite*1 | 7 | | 60 | | | | | 75 | | | | |
| c. Synthetic cordierite*1 | 12 | | | | | | | | 75 | 60 | | |
| d. Commercially available cordierite*1 | 30 | | | | | | | | | | | 60 |
| e. Alumina sol impregnated cordierite | 8 | | | 60 | | | | | | | | |
| f. Silica sol impregnated cordierite | 7 | | | | 60 | | | | | | | |
| g. Titania sol impregnated cordierite | 8 | | | | | 60 | | | | | | |
| Matrix (wt %) | | | | | | | | | | | | |
| Cordierite fine powder*2 | | 25 | 25 | 25 | 25 | 25 | 10 | 10 | 10 | 25 | 45 | 25 |
| Clay | | 10 | 10 | 10 | 10 | 10 | 10 | 10 | 10 | 10 | 10 | 10 |
| β-Spodumene fine powder*3 | | 5 | 5 | 5 | 5 | 5 | 5 | 5 | 5 | 5 | 5 | 5 |
| Pore forming material (coke powder 20–100 μm) wt parts | | 25 | 25 | 25 | 25 | 25 | 25 | 25 | 25 | 25 | 25 | 25 |
| Properties of the filter | | | | | | | | | | | | |
| Physical properties | | | | | | | | | | | | |
| Apparent porosity (%) | | 40 | 45 | 42 | 41 | 42 | 43 | 47 | 51 | 48 | 37 | 55 |
| Average pore size (μm) | | 35 | 28 | 32 | 31 | 32 | 37 | 30 | 32 | 30 | 20 | 25 |
| Bending strength (kg/cm²) | | 200 | 190 | 180 | 190 | 180 | 180 | 170 | 130 | 160 | 230 | 90 |
| Pressure loss (mmWG at 5 cm/sec, air) | | 95 | 90 | 110 | 120 | 110 | 80 | 70 | 160 | 180 | 270 | 20 |
| Filtering property | | | | | | | | | | | | |
| Pressure loss after reverse cleaning after 100 hrs (mmWG at 5 cm/sec, air) | | 450 | 430 | 470 | 480 | 470 | 420 | 410 | 1200 | 900 | 900 | 1100 |
| Increase of the residual pressure loss after 100 hrs | | No | No | No | No | No | No | No | Yes | Slightly | Slightly | Yes |
| Acid corrosion resistance | | | | | | | | | | | | |
| Decrease in the bending strength after immersion in 1N H₂SO₄ for 72 hrs at room temperature | | No | No | No | No | No | No | No | Yes | Yes | Slightly | Yes |

*1 Sieved to obtain particles of 200 to 28 mesh (74 to 590 μm).
*2 200 mesh pass, same material as the grog.
*3 325 mesh pass

TABLE 4

|  | Examples | | | | | | | | | | | | Comparative Ex. | | |
|---|---|---|---|---|---|---|---|---|---|---|---|---|---|---|---|
|  | 1 | 2 | 3 | 4 | 5 | 6 | 7 | 8 | 9 | 10 | 11*4 | 12 | 1 | 3*5 | 4 |
| Grog wt % | | | | | | | | | | | | | | | |
| a. Crystallized cordierite*1 | 60 | 60 | 60 | 60 | 60 | 60 | — | — | 75 | 60 | 60 | — | 63 | — | — |
| b. Synthetic cordierite*1 | — | — | — | — | — | — | 60 | 60 | — | — | — | 63 | — | 46 | — |
| c. Synthetic cordierite*1 | — | — | — | — | — | — | — | — | — | — | — | — | — | — | 60 |
| Matrix wt % | | | | | | | | | | | | | | | |
| Cordierite powder made of the same material as any one of the grog used (at most 74 μm)*2 | 25 | 25 | 25 | 25 | 25 | 25 | 25 | 25 | 10 | 25 | 25 | 26.5 | 27 | 19 | 25 |
| Clay | 10 | 10 | 10 | 10 | 10 | 10 | 10 | 10 | 10 | 10 | 10 | 10 | — | 10 | 10 |
| β-Spodumene (at most 44 μm)*3 | 5 | 5 | 5 | 5 | 5 | 5 | 5 | 5 | 5 | 5 | 5 | 0.5 | — | 25 | 5 |
| Bentonite | — | — | — | — | — | — | — | — | — | — | — | — | 10 | — | — |
| Additives (wt parts) | | | | | | | | | | | | | | | |
| Zirconia powder (ZrO₂) | — | 5 | 1 | 10 | — | — | 5 | — | 5 | 0.3 | 20 | 5 | — | 5 | — |
| Titania oxide powder (TiO₂) | — | — | — | — | 1 | 10 | — | 5 | — | — | — | — | — | — | 5 |
| Pore forming material (coke powder 20–100 μm) wt parts | 25 | 25 | 25 | 25 | 25 | 25 | 25 | 25 | 25 | 25 | 25 | 25 | 25 | 25 | 25 |
| Initial property | | | | | | | | | | | | | | | |

TABLE 4-continued

|  | Examples | | | | | | | | | | | | Comparative Ex. | | |
| --- | --- | --- | --- | --- | --- | --- | --- | --- | --- | --- | --- | --- | --- | --- | --- |
|  | 1 | 2 | 3 | 4 | 5 | 6 | 7 | 8 | 9 | 10 | 11*4 | 12 | 1 | 3*5 | 4 |
| Apparent porosity (%) | 40 | 37 | 39 | 35 | 38 | 34 | 42 | 40 | 39 | 39 | 28 | 51 | 39 | 25 | 40 |
| ending strength at room temp. (kg/cm$^2$) | 200 | 128 | 111 | 144 | 120 | 152 | 88 | 104 | 112 | 190 | 200 | 32 | 160 | 220 | 210 |
| ending strength at 800° C. (kg/cm$^2$) | 140 | 95 | 78 | 110 | 92 | 109 | 65 | 75 | 80 | 121 | 138 | 25 | 25 | 98 | 115 |
| Average pore size (μm) | 35 | 32 | 34 | 30 | 32 | 29 | 26 | 25 | 34 | 33 | 18 | 45 | 33 | 20 | 30 |
| Pressure loss (mmWG at 5 cm/sec, air) | 95 | 130 | 110 | 150 | 120 | 160 | 140 | 150 | 110 | 100 | 380 | 60 | 120 | 420 | 150 |
| Bending strength after heating 24 hrs at 900° C. (kg/cm$^2$) | 97 | 125 | 110 | 141 | 110 | 150 | 85 | 103 | 110 | 92 | 195 | 30 | 85 | 217 | 105 |
| Filtering property |  |  |  |  |  |  |  |  |  |  |  |  |  |  |  |
| Pressure loss after reverse cleaning after 100 hrs (mmWG at 5 cm/sec, air) | 450 | 490 | 470 | 500 | 480 | 515 | 490 | 510 | 470 | 485 | 790 | 1100 | 490 | 710 | 950 |
| Increase of the residual pressure loss after 100 hrs | No | No | No | No | No | No | No | No | No | No | No | Slightly | No | No | Yes |

*1Sieved to obtain particles of 200 to 28 mesh (74 to 590 μm).
*2200 mesh pass
*3325 mesh pass
*4Small cracks were observed after sintering.
*5Substantial distorsion during sintering.

What is claimed is:

1. A ceramic filter for a dust-containing gas, which comprises a filter base having an average pore size of from 10 to 100 μm, and a filter layer having an average pore size of from 0.2 to 10 μm fixed at least to the filtering side surface of the filter base so that the filter layer substantially fills the pores open on the surface of the filter base.

2. The ceramic filter according to claim 1, wherein the filter base has an apparent porosity of from 35 to 50%.

3. The ceramic filter according to claim 1, wherein the filter base is made of cordierite.

4. The ceramic filter according to claim 3, wherein the filter layer is made of diatomaceous earth or rich hull ash.

5. The ceramic filter according to claim 1, wherein the filter base is made of silicon carbide.

6. The ceramic filter according to claim 1, wherein the filter base has a shape of a tube, and the filter layer is fixed to the inner surface of the tube.

7. A ceramic filter for a dust-containing gas, which comprises a filter base comprising at least 50 wt% of a cordierite grog having an apparent porosity of at most 10% and a particle diameter of from 74 to 590 μm, and a matrix, wherein said matrix comprises silica ($SiO_2$) and alumina ($Al_2O_3$) as the main components and contains from 0.2 to 0.6 wt%, based on the weight of the entire filter, of lithium oxide ($Li_2O$), said filter base having an average pore size of from 10 to 100 μm, and a filter layer having an average pore size of from 0.2 to 10 pm fixed at least to the filtering side surface of the filter base so that the filter layer fills the pores open on the surface of the filter base.

8. The ceramic filter according to claim 7, wherein the cordierite grog is a cordierite grog crystallized from a glass having approximately a cordierite composition ($2MgO.2Al_2O_3.5SiO_2$).

9. The ceramic filter according to claim 8, wherein the filter layer is made of diatomaceous earth or rice hull ash.

10. The ceramic filter according to claim 9, wherein the filter base has a shape of a tube, and the filter layer is fixed to the inner surface of the tube.

11. A method for producing a ceramic filter for a dust-containing gas, which comprises rubbing a powder at least into the filtering side surface of a filter base having an average pore size of from 10 to 100 μm, the powder to form a filter layer having an average particle diameter smaller than the average pore size of the filter base, and then fixing the powder with an inorganic binder.

12. The method for producing a ceramic filter according to claim 11, wherein a first powder is rubbed into the surface of the filter base, then a second powder having a particular size finer than the first powder is rubbed into the surface, then both said first an second powders are fixed to the surface of the filter base.

13. The method for producing a ceramic filter according to claim 12, wherein the average particle diameter of the first powder is from 20 to 70% of the average pore size of the filter base, and the average diameter of the second powder is from 2 to 15% of the average pore size of the filter base.

14. The method for producing a ceramic filter according to claim 12, wherein the sintering is conducted at a temperature of from 1,310° to 1,380° C.

15. The method for producing a ceramic filter according to claim 11, wherein the inorganic binder is a solution containing silica as the main component, and this solution is sprayed to the surface into which said powder was rubbed, and then heated and dried for fixing.

16. The method for producing a ceramic filter according to claim 15, wherein the solution containing silica as the main component is a 1 to 5 wt% silica sol aqueous solution.

17. The method for producing a ceramic filter according to claim 11, wherein the molding of the filter is conduced by an isostatic press using a metal core mold and an outer cylindrical rubber mold, to form a tube and the powder is rubbed into he inner side surface of the filter base.

18. The method for producing a ceramic filter according to claim 11, wherein the molding of the filter is conducted by an isostatic press using a metal core mold and outer cylindrical rubber mold, to form a tube and the powder is rubbed into the inner side surface of the filter base.

19. The method for producing a ceramic filter according to claim 11, wherein the sintering is conducted to a temperature of from 1,310° to 1,380° C.

* * * * *

UNITED STATES PATENT AND TRADEMARK OFFICE
CERTIFICATE OF CORRECTION

PATENT NO. : 5,198,006

DATED : March 30, 1993

INVENTOR(S) : Takashi Mimori et al.

It is certified that error appears in the above-identified patent and that said Letters Patent is hereby corrected as shown below:

On the title page, Item [75],

The third inventor's name is spelled incorrectly, should read as follows: --Yasuhiko Endo--

Signed and Sealed this

Twenty-third Day of November, 1993

Attest:

Attesting Officer

BRUCE LEHMAN

Commissioner of Patents and Trademarks